(12) United States Patent
Laskawiec et al.

(10) Patent No.: US 11,604,776 B2
(45) Date of Patent: Mar. 14, 2023

(54) MULTI-VALUE PRIMARY KEYS FOR PLURALITY OF UNIQUE IDENTIFIERS OF ENTITIES

(71) Applicant: INTERNATIONAL BUSINESS MACHINES CORPORATION, Armonk, NY (US)

(72) Inventors: Andrzej Laskawiec, Cracow (PL); Monika Piatek, Cracow (PL); Lukasz Stanislaw Studzienny, Cracow (PL); Marcin Filip, Cracow (PL); Marcin Luczynski, Cracow (PL); Michal Bodziony, Tęgoborze (PL); Tomasz Zatorski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 16/839,200

(22) Filed: Apr. 3, 2020

(65) Prior Publication Data
US 2021/0311917 A1    Oct. 7, 2021

(51) Int. Cl.
*G06F 16/00* (2019.01)
*G06F 16/215* (2019.01)
(Continued)

(52) U.S. Cl.
CPC .......... *G06F 16/215* (2019.01); *G06F 16/242* (2019.01); *G06F 16/284* (2019.01)

(58) Field of Classification Search
CPC .... G06F 16/215; G06F 16/242; G06F 16/284; G06F 17/30067; G06F 17/30489; G06F 3/0641; G06F 3/0608; G06F 9/52
See application file for complete search history.

(56) References Cited

U.S. PATENT DOCUMENTS 8,832,041 B1   9/2014 Teh
2004/0003005 A1*  1/2004 Chaudhuri ............ G06F 16/215
(Continued)

FOREIGN PATENT DOCUMENTS

AU    2021250715 A1   9/2022
CN     101355448 A    1/2009
(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Ashish Thomas
*Assistant Examiner* — Suman Rajaputra
(74) *Attorney, Agent, or Firm* — Alexis N. Hatzis

(57) ABSTRACT

A computer-implemented method for unambiguously identifying entities in a database system may be provided. The method comprises storing data items as records with different attributes in a table of a database, storing naming rules for selected combinations of the attributes of the data items, and prioritizing the naming rules. The method also comprises determining a hash value for each of the selected combinations of the attributes of the data items, and identifying duplicate data items using the determined hash values and the prioritized naming rules.

20 Claims, 11 Drawing Sheets

(51) Int. Cl.
*G06F 16/28* (2019.01)
*G06F 16/242* (2019.01)

(56) References Cited

U.S. PATENT DOCUMENTS

| | | | |
|---|---|---|---|
| 2010/0005048 A1* | 1/2010 | Bodapati | G06N 5/02 |
| | | | 706/47 |
| 2012/0096163 A1* | 4/2012 | Tai | G06F 16/27 |
| | | | 709/226 |
| 2014/0143211 A1 | 5/2014 | Baker | |
| 2016/0092494 A1 | 3/2016 | Kabra | |
| 2016/0098428 A1 | 4/2016 | Dolega | |
| 2017/0011088 A1* | 1/2017 | Muehlich | G06F 16/284 |
| 2017/0308557 A1* | 10/2017 | Cassidy | G06N 20/00 |
| 2019/0129954 A1* | 5/2019 | Williams | G06F 16/164 |
| 2019/0318117 A1* | 10/2019 | Beecham | H04L 9/3239 |

FOREIGN PATENT DOCUMENTS

| | | |
|---|---|---|
| CN | 110597804 A | 12/2019 |
| IL | 295594 A | 10/2022 |

OTHER PUBLICATIONS

Wikipedia, "Configuration Management Database", https://en.wikipedia.org/wiki/Configuration_management_database, printed Feb. 20, 2020, pp. 1-4.

Pending International Search Report and Written Opinion, International Application No. PCT/IB2021/051847, International filing date Mar. 5, 2021, dated Jun. 17, 2021, pp. 1-7.

* cited by examiner

| Alias/PK | Row-ID | Name | EIN |
|---|---|---|---|
| CNR1#A | CRID1 | ABC | |
| CNR2#B | CRID2 | A-B-C | EIN1234 |

FIG. 3a

| Alias/PK | Row-ID | Customer | Street | City |
|---|---|---|---|---|
| ANR1#A | ARID1 | CRID1 | Street ABC | Some City |
| ANR1#B | ARID2 | CRID2 | Street ABC | Some City |

FIG. 3b

| Alias/PK | Row-ID | Customer | Number | Date |
|---|---|---|---|---|
| ONR1#A | ORID1 | CRID1 | ORD/0284/2019 | 6/3/2019 |
| ONR1#B | ORID2 | CRID2 | ORD/0198/2019 | 13/2/2019 |

FIG. 3c

| Alias/PK | Row-ID | Name | EIN |
|---|---|---|---|
| CNR1#A | CRID1 | ABC | |
| CNR2#B | CRID2 | A-B-C | EIN1234 |
| | | ABC | EIN1234 |

FIG. 4a

| Alias/PK | Row-ID | Name | EIN |
|---|---|---|---|
| CNR1#A, CNR2#B | CRID1 | ABC | EIN1234 |

FIG. 4b

| Alias/PK | Row-ID | Customer | Street | City |
|---|---|---|---|---|
| ANR1#A | ARID1 | CRID1 | Street ABC | Some City |
| ANR1#B | ARID2 | CRID2 | Street ABC | Some City |

FIG. 4c

| Alias/PK | Row-ID | Customer | Street | City |
|---|---|---|---|---|
| ANR1#A, ANR1#B | ARID1 | CRID1 | Street ABC | Some City |

FIG. 4d

MULTI-VALUE PRIMARY KEYS FOR PLURALITY OF UNIQUE IDENTIFIERS OF ENTITIES

BACKGROUND

The invention relates generally to a database system, and more specifically, to a computer-implemented method for unambiguously identifying entities in a database system. The invention relates further to a related database system for unambiguously identifying entities in the database system, and a computer program product adapted to perform the method.

Enterprise information management remains one of the key topics of enterprise IT (Information Technology) organizations. This is not only true for the large Global 2000 companies but also for small and midsized businesses. The reason is simple: the number of sources for data management and the sheer amount of data to be managed to be successful in the information age is ever-growing. One approach to addressing this difficult situation has been to create enterprise data catalogs in the context of data warehouse projects and to use data management concepts. However, reality has shown that this approach is quite difficult as new data sources and new types of data hit IT organizations in ever shorter periods of time. Thus, a more dynamic way to address this common problem in many enterprise applications and across those applications of duplicate data objects is required.

For example, the same customer can be entered many times into an ERP system with slightly different names or with employer identification number (e.g., tax number) put in different formats. It is not enough to create some unit constrains because the same customer name may be saved with upper or mixed case or with a full company name or a short name. Over time, those topics can be discovered, but merging of other related data is often difficult, time-consuming and sometimes impossible. In the course of time, invoices, orders, and many other related data objects may be created in the ERP system—and also in related systems like, a customer relationship management system (CRM), a supply chain management system (SCM), a logistic system, and so on). Also all these systems may use the duplicated customer records. If, for example, one would like to give a customer discount based on a cumulative order value, it requires aggregating the orders saved with different customer data, a functionality which may not be available in today's ERP systems.

However, the described problem does not only exist in databases storing customer data and the like, but also in databases for highly technical applications, e.g., configuration management databases (CMDB) used to control, prioritize and allow or deny access to compute resources.

There are several disclosures related to a computer-implemented method for de-duplication of an entries storage system. Document US 2017/0308557 A1 discloses a method and a system for cleansing and de-duplicating data in a database. The method includes filtering garbage records from a plurality of records based on data fields, and applying cleansing rules to create a cleansed database. A similarity vector is generated, where each vector corresponds to pair-wise comparison of distant data entries in the cleansed database. Matching rules are applied to label each vector as one of matched, unmatched and unclassified.

Additionally, document US 2017/0011088 A1 discloses a method for finding doublets in a database comprising calculated hash values for at least two field groups for records in the database, wherein a field group comprises at least two fields of the records, and a hash value of the few groups for a record is based on the values in the at least two years of the respective field group stored in the respective record.

However, these known approaches to address the problem, as discussed above, cannot solve the difficulties enterprise information organizations face when dealing with multiple entries in a database supporting enterprise and/or technical applications seamlessly and effortlessly.

Hence, there may be a need to overcome the above-described technical problem and provide an advanced solution to correctly store and unambiguously identify entities that relate to the same and/or different data objects.

SUMMARY

According to one aspect of the present invention, a computer-implemented method for unambiguously identifying entities in a database system may be provided. The method may comprise storing data items in a table of a database, the data items being stored as records comprising a plurality of attributes, storing naming rules for selected combinations of the attributes of the data item, and prioritizing the naming rules. The method may also comprise determining a hash value for each of the selected combinations of the attributes of the data item, and identifying duplicate data items using the determined hash values and the prioritized naming rules.

According to another aspect of the present invention, a database system for unambiguously identifying entities in the database system may be provided. The database system may comprise first storage means adapted for storing data items in a table of a database system, the data items being stored as records comprising a plurality of attributes, second storage means adapted for storing naming rules for selected combinations of the attributes of the data item, and prioritization means adapted for prioritizing the naming rules. The database system may also comprise determining means adapted for determining a hash value for each of the selected combinations of the attributes of the data item, and identification means adapted for identifying duplicate data items using the determined hash values and the prioritized naming rules.

The proposed computer-implemented method for an execution of a stateless service on a node in a workload environment may offer multiple advantages, technical effects, contributions and/or improvements:

The problem of duplicate data entries in the sense that two records identify the same physical entity is successfully addressed. The proposed solution is based on using a multi-valued key and naming rules as well as a prioritization of the naming rules together with a determination of a hash value for the selected combinations of attributes of the data item in order to unambiguously identify entities in the database. This may render the problem of using classical enterprise data management systems (e.g., commercial databases) as well as technical databases (e.g., CMDB) having stored multiple the records meant to identify the same physical entity as solved.

This will make it much easier for enterprise information management to eliminate double but slightly different entries in a database system if the same unique physical entity shall be described. The proposed method and system relies on the concept and works automatically and autonomously once it is set up. For example, duplicate entries may be identified automatically and merged to the extent necessary and predefined without any additional manual intervention.

The proposed concept may be especially useful for online transaction database systems in contrast to de-duplication efforts in backup or archive systems. However, the proposed method may be used advantageously in other environments. Based on the ever growing number of sources for additional data in enterprise computing environments, the proposed concept may help to better manage enterprise intellectual property in terms of customer, prospect, and product identities as well as technical data used to manage large and complex enterprise IT devices or networks, including personal devices and on-site computing systems, as well as remotely accessible computing resources (e.g., in the sense of cloud computing concepts).

In the following, additional embodiments of the inventive concept—applicable to the inventive method as well as to the related database system—will be described:

According to one useful embodiment of the method, the database system may be a relational database system. This may represent the most common application. However, for the proposed concept, other types of databases or storage concepts may used for the proposed technical idea, such as object-oriented databases, graph databases, hierarchical databases, a flat file system storing data records, and so on.

According to another useful embodiment of the method, the database system may be a configuration management database (CMDB). Such databases may underlie a specific internal organization and may in particular be used to manage technical devices and applications in data centers. Thus, the proposed concept may easily be used in different technical fields.

According to an advantageous embodiment, the method may also comprise merging the identified duplicate data items by maintaining the determined hash values as a multi-valued key for a merged—i.e., combined—data item. Hence, the concept of the multi-valued key in database systems may here build a solid technical basis for the implementation of the here proposed concept.

According to an advanced embodiment, the method may also comprise merging other data items that are in composite relationship with the identified data items. Hence, not only the application data fields themselves may be directly related to each other, but also dependent data—i.e., those that are in composite relationship with the identified duplicating data item may be merged, so that all data describing characteristics of an entity may be jointly and unambiguously accessible.

According to another advantageous embodiment, the method may also comprise maintaining a pointer to a same row identifier—i.e. Row-ID—of the merged—i.e., combined—data item for the determined hash values. Thereby, primary key uniqueness may be maintained, and the Row-IDs may become the real primary key in the table of the database. However, they are not visible to the database user at all. Alternatively, they may be visible to the database user but may not be changeable by the database user.

According to a further advanced embodiment, the method may also comprise maintaining an index of the table, and maintaining a pointer in a search tree related to the index such that for combined data items, the pointer value may point to the same record identifiers. Consequently, the here proposed concept may also be expounded to fast searches in the database. The central applied idea does not slow down the functioning of search trees. This is achieved by giving the pointers in different branches of the index tree the same value.

According to an even further advanced embodiment, the method may also comprise using a "create SQL statement"—which is herewith newly defined—adapted for a creating of the naming rule and its related priority. Hence, a user or an application program (e.g. via an API) may create the naming rules and the related priority as required for a specific application or naming conventions typically used for identifying entities, described by data items.

According to one permissive embodiment, the method may also comprise using a multi-value primary key for a sorting of records in the table of the database. Thus, the proposed concept is not typically used in the way of normal database table operations and not typically applied to traditional database system tables.

According to another permissive embodiment of the method, a multi-value primary key may be used for clustering cluster data on multi-node database engines. Thus, the proposed concept may also be expandable to more complex and distributed types of databases.

According to a further useful embodiment of the method, a multi-value primary key may be comparable to a single value column data item. Hence, known operations like data field comparisons across tables—as known from traditional databases—may also be applicable under the here proposed technical concept.

According to an additionally advanced embodiment, the method may also comprise collecting statistical database data for data blocks for single-valued primary key and multi-valued primary keys. Therefore, the technical concept of the method is not only to manage database systems according to best practices, but also to allow the use of statistical methods to better manage the underlying database management system, including the multi-valued keys.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
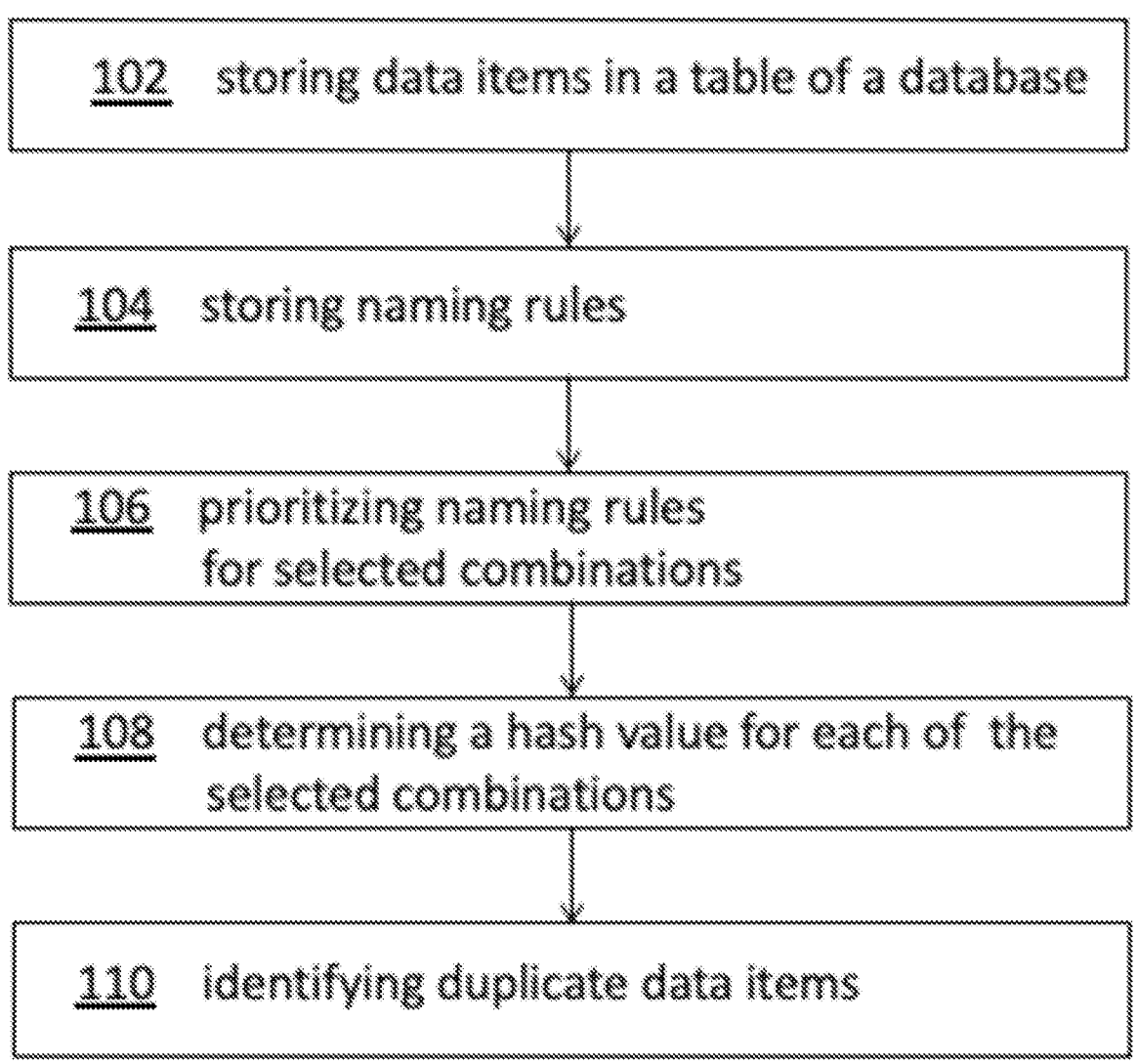

The following detailed description, given by way of example and not intended to limit the exemplary embodiments solely thereto, will best be appreciated in conjunction with the accompanying drawings, in which:

FIG. 1 shows a block diagram of an embodiment of the inventive computer-implemented method for unambiguously identifying entities in a database system.

Figures 2A, 2B:
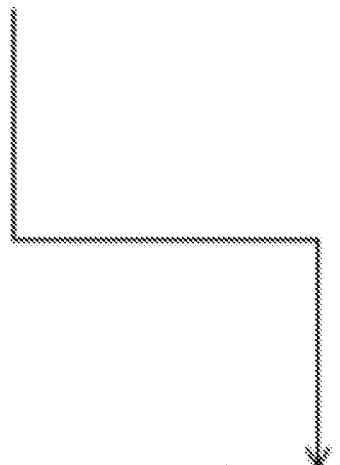

FIG. 2a shows a table showing different records for the physical same entity.

FIG. 2b shows a table illustrating the problem of a discount on a total order volume.

FIGS. 3a, 3b, and 3c show hierarchically organized database tables with exemplary fields, name, address and order data.

FIGS. 4a and 4b show entries of database table entries to be merged based on a unique attribute.

FIGS. 4c and 4d show entries of database table entries to be merged based on a naming rule.

Figure 5A:
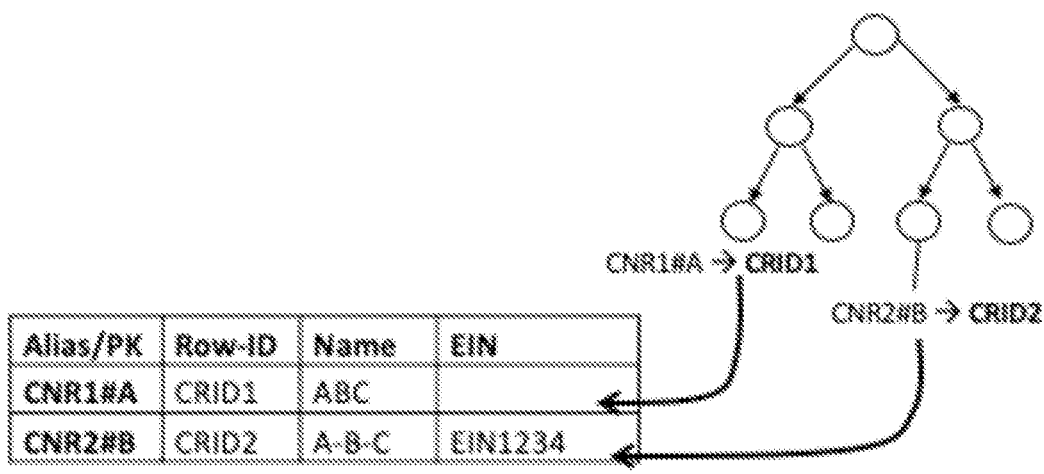
Figure 5B:
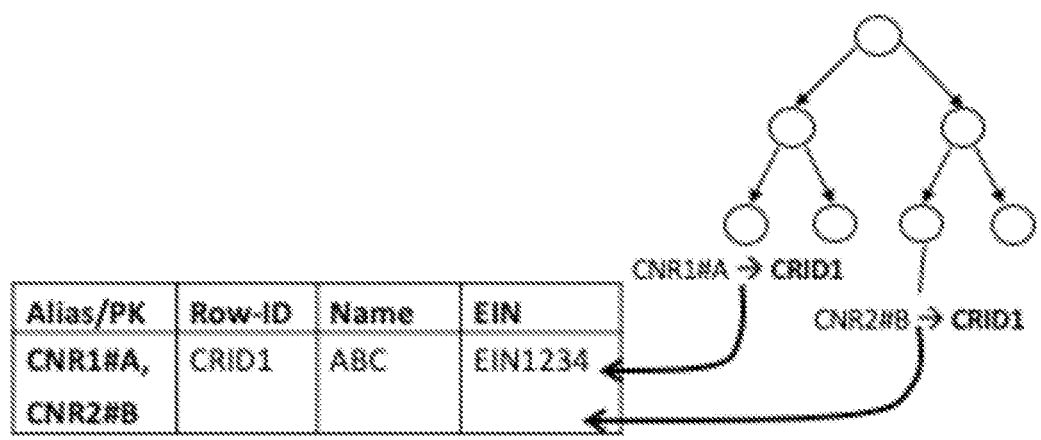

FIGS. 5a and 5b show entries of database table entries to be merged together with a related index tree.

Figure 6A:
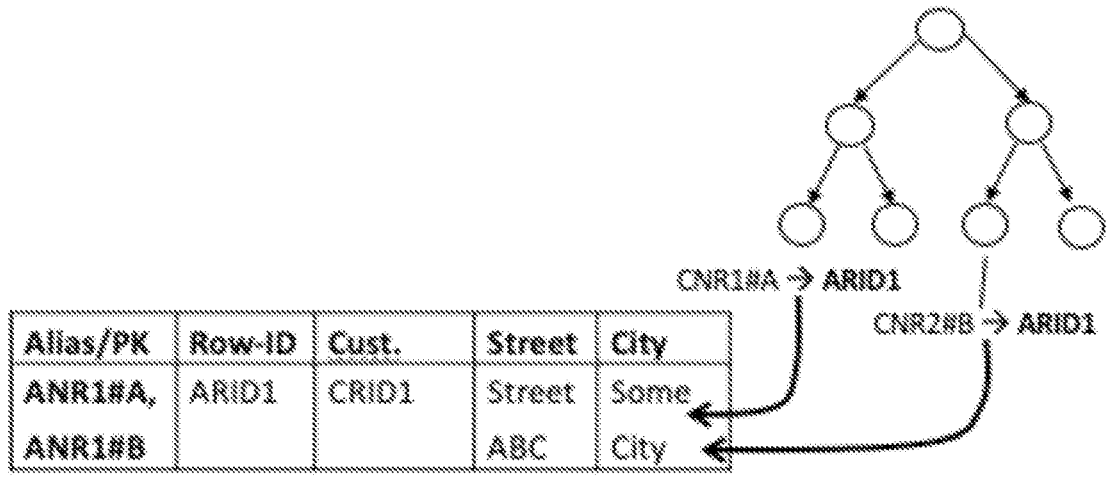
Figure 6B:
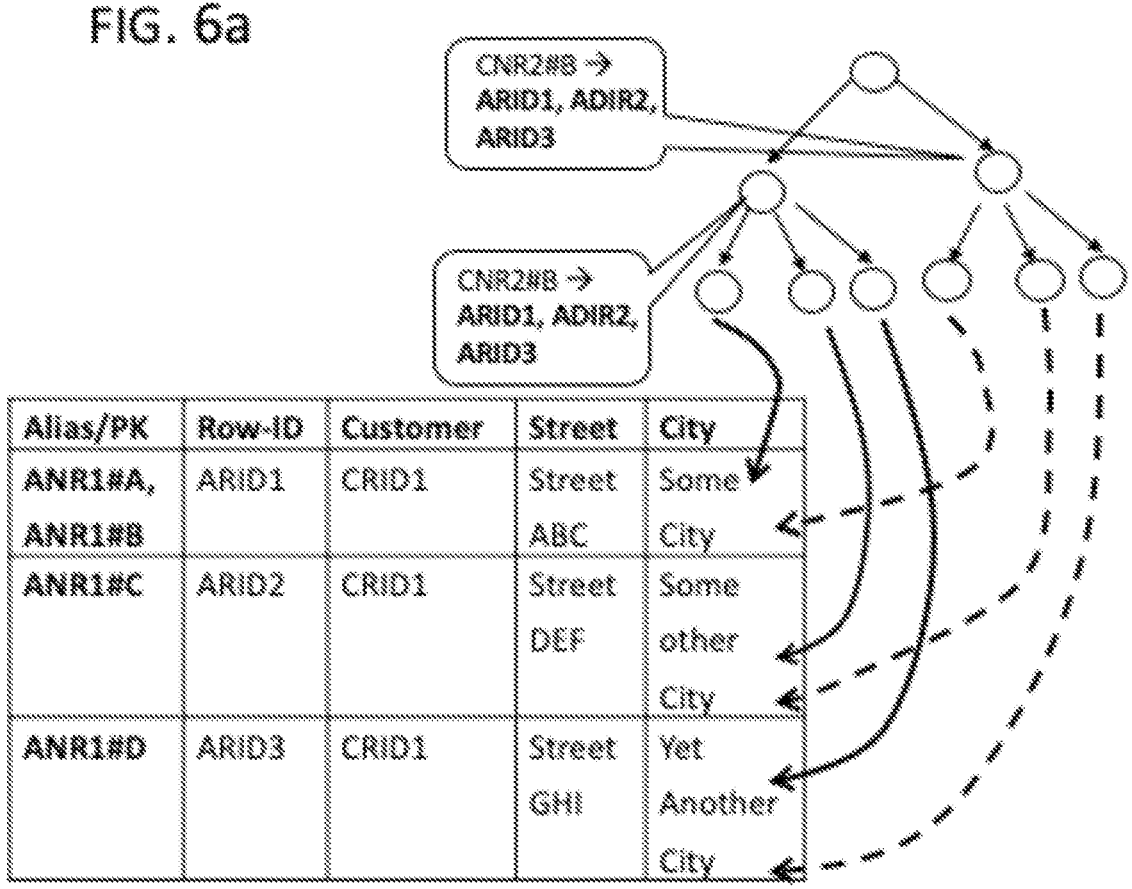

FIGS. 6a and 6b show entries of database table entries to be merged under a naming rule together with a related index tree.

Figure 7:
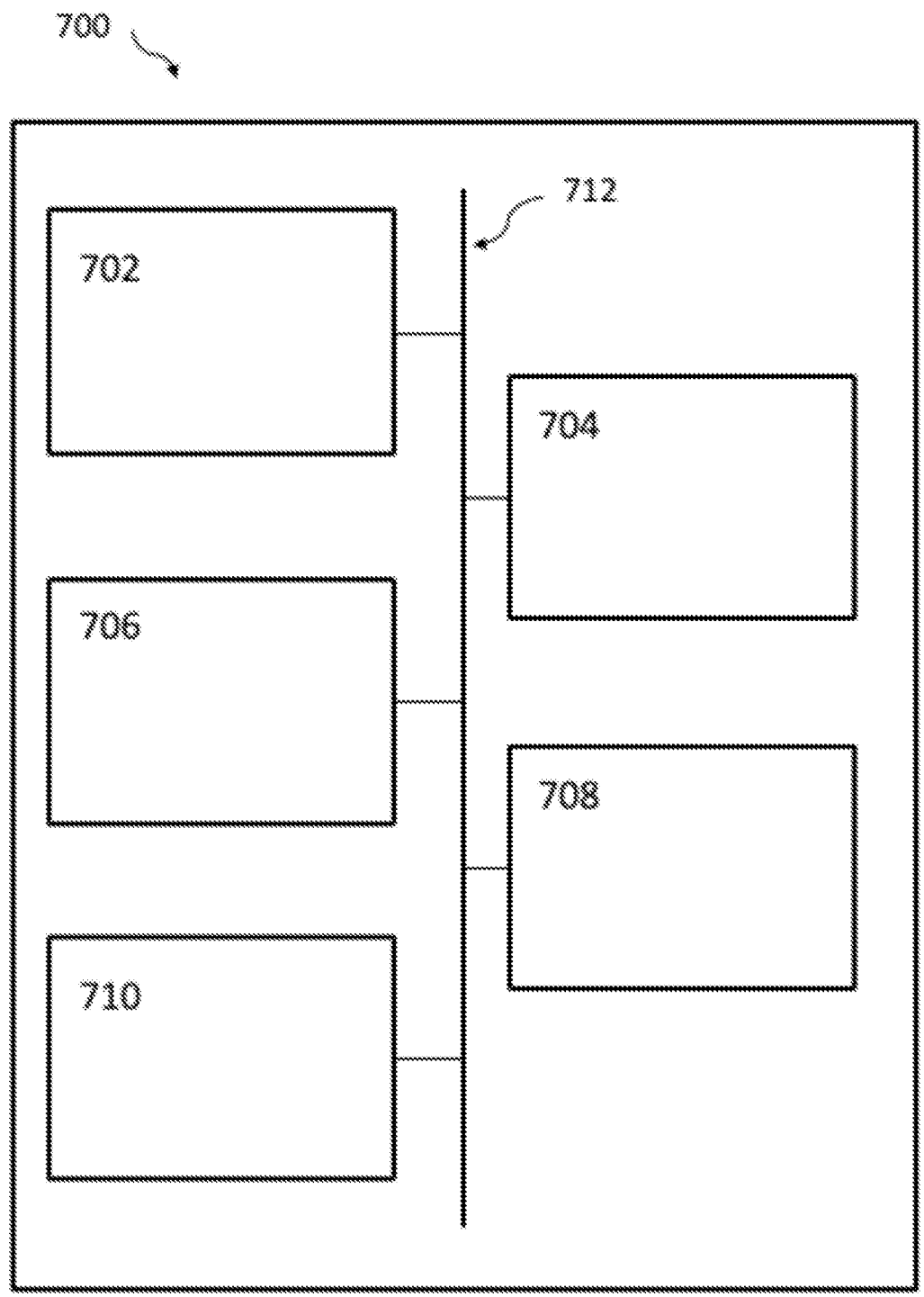

FIG. 7 shows a block diagram of an embodiment of the database system for unambiguously identifying entities in a database system.

Figure 8:
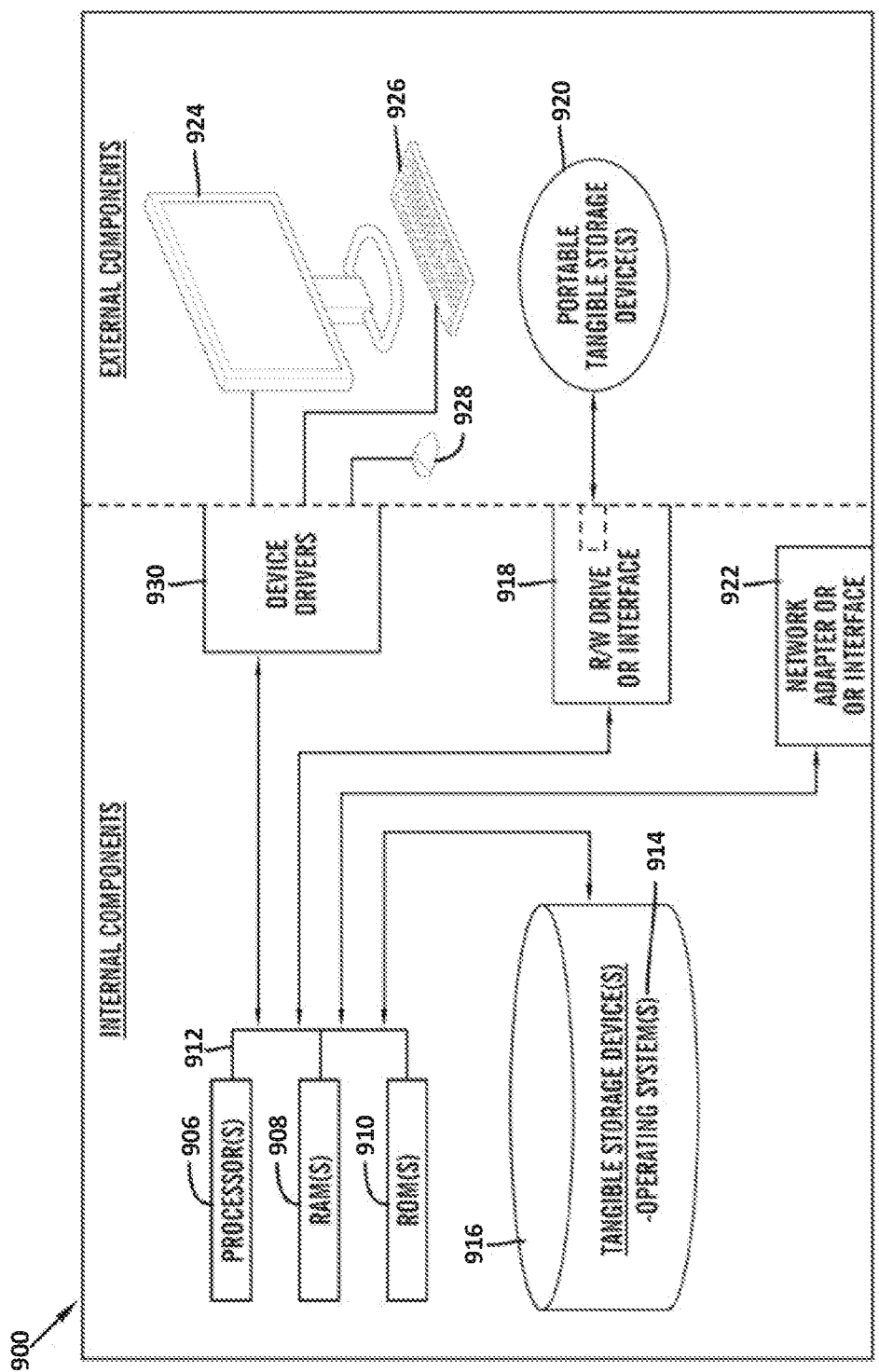

FIG. 8 shows an exemplary block diagram depicting the hardware components of the computing system comprising the database system according to FIG. 7, in accordance with the exemplary embodiments.

Figure 9:
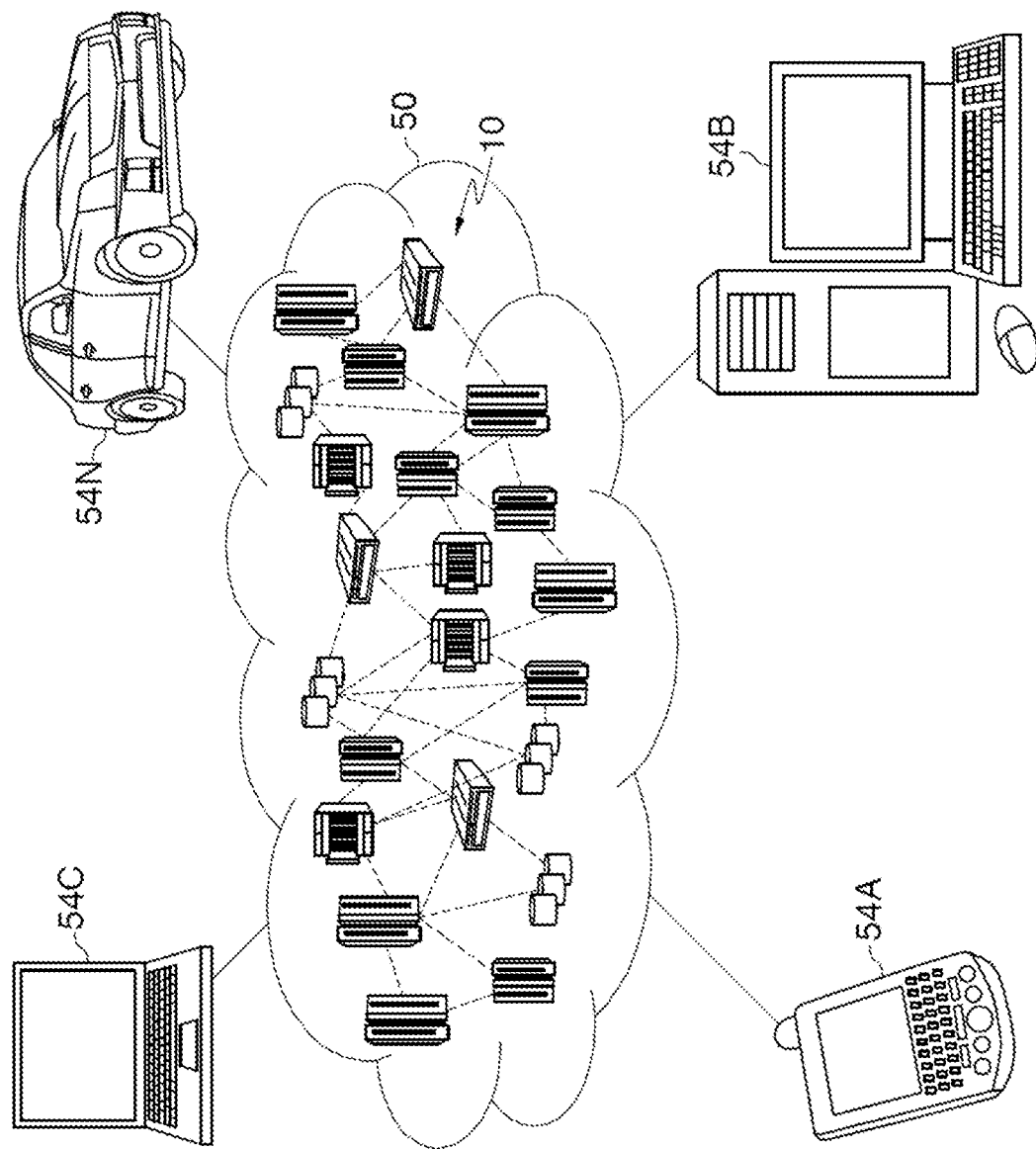

FIG. 9 shows a cloud computing environment, in accordance with the exemplary embodiments.

Figure 10:
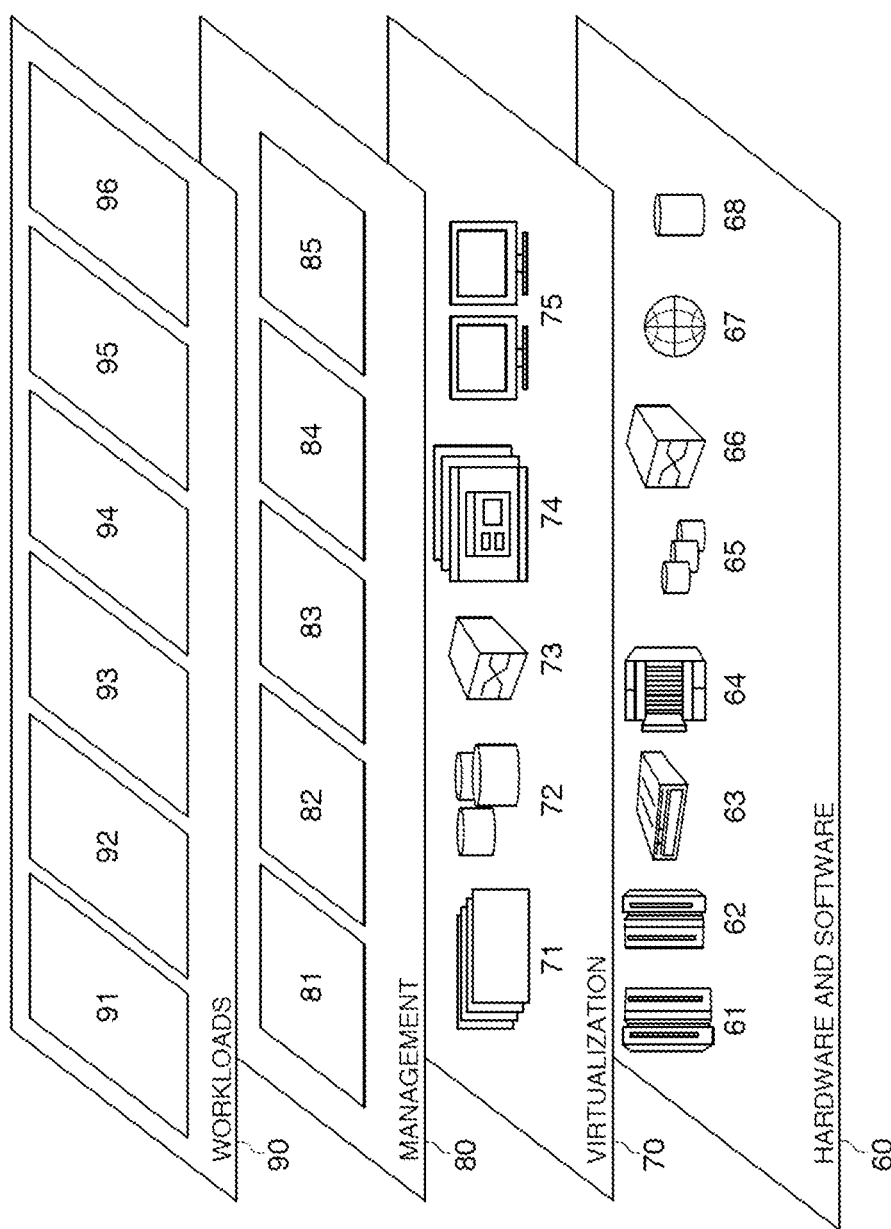

FIG. 10 depicts abstraction model layers, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

In the context of this description, the following conventions, terms and/or expressions may be used:

The term 'unambiguously identifying' may denote the ability to non-interchangeably identify physical items uniquely by a related data item. In simple words, there should not be two data items pointing to the same physical entity.

The term 'entity' may denote a physical object to be identified and/or addressed by a data item, e.g., a record to a database.

The term 'database system' may denote a storage device—either physical or logical—adapted for storing data items. Examples of a delivery system may be a relational database system, a hierarchical database system, a flat file system, a graph database and/or an object database or a combination of the above. Generally, the proposed concept can work in a large variety of different databases.

The term 'relational database system' may denote a database system being organized according to the rules of C. F. Codd. A relational database system may denote a storage device enabled to stored data preferably in records, either of fixed or of variable length each. Typically—and especially in relational database systems—data are organized in tables having rows. Each row may represent a record with attributes. Different records of different tables may be set in relationship by applying selection routes to the attributes.

The term 'attribute' may denote a field in a record of a table in a database system.

The term 'naming rule' may denote constraints or an interpretation framework to be applied to attributes of a record. The naming rules may be formulated in a way to relate similar but different data items to each other.

The term 'prioritizing the naming rules' may denote defining a sequence of the available naming rules according to their importance for a specific attribute or a combination thereof.

The term 'hash value' may denote a mapping of a data field of variable length (e.g., a text field) to a data field with fixed length, e.g., an integer value. The mapping may typically be performed using a hash function or a hash table.

The term 'duplicate data item' may denote the process of eliminating data items that relate to the same physical entity but which may have only similar values in specific attributes instead of identical ones. However, it should be noted that the similar values of the attribute will not be eliminated but only redundant information and other attributes.

The term 'multi-valued key' may denote the concept of having more than one value in a key attribute field instead of only one according to traditional rules. The uniqueness may now no longer be defined via this specific attribute but by a Row-ID to which a user may not have manipulative access.

The term 'composite relationship' may be interpreted in the sense of UML (universal markup language). A composite relationship may represent a specific case of an association. In both, aggregation and composition, an object of a class "owns" another object of a higher class. As an example, a room may not exist without a house. Thus, the two objects room/house have a composite relationship.

The term 'row identifier' may denote a unique identifier in a specific table of a database identifying uniquely a specific record. The row identifier, i.e., Row-ID, may be used as a replacement for an original primary key which may have been replaced by a multi-valued primary key.

The term 'index' may denote a mechanism to increase an access speed to individual records in a database table, particularly in search operations. Index tree leaves may comprise pointers to specific records, e.g., to specific Row-IDs.

The term 'SQL statement' may denote a command in the programming language used for databases called structured query language (SQL).

In the following, a detailed description of the figures will be given. All instructions in the figures are schematic. Firstly, a block diagram of an embodiment of the inventive computer-implemented method for unambiguously identifying entities in a database system is given. Afterwards, further embodiments as well as embodiments of the database system for unambiguously identifying entities in the database system will be described.

FIG. 1 shows a block diagram of a preferred embodiment of the computer-implemented method 100 for unambiguously identifying entities in a database system. The method 100 comprises storing, 102, data items in a table of a database—in particular in the form of records in a relational database but also any other storage format. The data items are stored as records comprising a plurality of attributes of fixed or variable length, respectively.

The method 100 comprises storing, 104, naming rules—in particular at least two rules for two combinations of attributes—for selected combinations of the attributes of the data item. It may be noted that a combination can also be related to only one attribute.

Furthermore, the method 100 comprises prioritizing, 106, the naming rules, i.e. defining a sequence of applying them or defining an order of the rules. The periodization shall be dependent on their importance for entity identification.

Then, the method 100 comprises determining, 108, a hash value—using a hash function—for each of the selected combinations of the attributes of the data item, and identifying, 110, duplicate data items—in particular at least one record—using the determined hash values and the prioritized naming rules.

In other words, naming rules are a way to uniquely identify given entity. Naming rules are based on entity attributes. For example, to identify the customer, one can use his name. In most cases, just the customer name is enough to distinguish customers. Thus, this can be the first naming rule. The next naming rule can use a customer's tax identifier, sometimes called employer identification number (EIN).

Naming rules can also be based on a set of attributes, for example, a good naming rule would be the one based on a customer's name and his related EIN.

Naming rules for a given entity shall be sorted based on their respective importance. For example, a naming rule based on EIN is better because it is almost impossible to have two customers with the same EIN. It is also more important because if the person creating a record for a customer in the system has access to an EIN database (or database table), they likely also have access to other relevant customer data. Hence, somebody that only knows the customer's name but not their related EIN, is not a very good source of customer data. Therefore, naming rules based on just the customer name shall have a comparably low priority.

Naming rules are created for a given table and are automatically considered and applied by the database engine. When one enters a record for a table, the database system lists all applicable naming rules (i.e., or name words based on attributes that are not null attribute values). The database engine then determines each naming rule value is a hash value based on concatenated attributes' values.

For example, for a customer, one may use the first naming rule mentioned above and determine its value as $NR1$=hash(customer name)=hash($ABC$)=UUID1, and $NR2$=hash(customer EIN)=hash(EIN1234)=UUID2.

With this, both values can be used as a given record primary key. A record can contain many naming words, and as a result, there can be many primary keys (as opposed to the original, historical definition of the primary key in databases). The related record can now be found and identified by each of them, so each of them is an equally important primary key. The solution to this potential foreground conflict is the usage of unique Row-IDs as the true unique primary keys which, however, are typically not accessible to database users.

Since one has multiple values as a primary key, one can also use it as a foreign key. So, to create foreign key constraints, one can use row's ROW-IDs (unique row identifiers), which is a given row internal identifier, which can—under certain circumstances—be visible to the database user, but it should never be used in database users' queries. The database engine or database system may prohibit this activity.

FIG. 2a shows database table entries showing different records for the same physical entity. More explanatory text, relating to this figure, can be found in the background section of this document. The column PK refers to the shown primary keys customer identifier CID1, CID2, CID3 relating to customer names ABC, A-B-C and ABC Ltd. which may—in this example—be referred to as the same physical entity, i.e., the same customer. In this example, the customer is shown, with two similar but not completely identical EIN numbers EIN1234 and EIN-1234.

FIG. 2b shows database table entries illustrating the problem of a discount on an order volume. The text describing the problem can be found in the background section of this document. Thus, FIG. 2b shows an order entry table with a primary key order entry (IODi), an order number, a customer identifier, and an order value per column. The link between the two tables is based on the customer identifier as indicated by the arrow. All further examples of tables and database entries in record form should be interpreted in this described sense.

FIGS. 3a, 3b, and 3c show hierarchically organized database tables with the exemplary fields: name, address and order data. FIG. 3a shows that the two customers (potentially identical) are registered in the database. FIG. 3b shows related addresses of the customers of FIG. 3a. Each of them has an order as shown in FIG. 3c.

It may be assumed that somebody wants to create a new customer named "ABC" with "EIN1234". This is shown in the following figures.

FIGS. 4a and 4b show entries of database table entries to be merged based on a unique attribute. As a result of such a merge of records, two existing customer records need to be merged—in particular the one of the first row of the table of FIG. 4a, and the one with the third record in the table of FIG. 4a as indicated by the right side ellipse within FIG. 4a. The attribute "name" comes from the third row created with a naming rule defining a higher priority (note that in the third row EIN attribute, which is of higher priority, is set), so that "ABC" is kept as the name. The EIN field is empty in the first row, so that the value from the second row is kept in the merged records. As a result, one has one entry with a double primary key CNR1 #A, CNR2 #B but with one true unique identifier shown as RowID (row identifier).

FIGS. 4c and 4d show entries of database table entries to be merged based on a naming rule in a superior context. Typically, addresses are "named" in a context of the customer. This means that they cannot exist without a superior object, i.e., object "customer". This is denoted in the address naming rule in which "customer" is defined as the first attribute. Since superior objects should be merged (customers), one needs to determine if one also needs to merge dependent objects (objects named in context of a customer, i.e., here the address).

FIG. 4c and FIG. 4d refer to such a context in which the attributes "street" and "city" are merged, such that the multi-valued primary key ANR1 #A and ANR1 #B are created under the unique Row-ID ARID1.

Hence, one can determine that merged customers have two addresses with the same attribute "street" and "city" that can be merged. The old primary key value ANR1 #B is also kept because it could be used as a reference in other objects or even in some external systems. But since it is determined using a previous Row-ID, there is no risk of conflict with other primary key values, which could result in an over-merge. Over-merge is a situation where two distinct objects, which would present different entities, are merged, although they shouldn't be.

FIGS. 5a and 5b show entries of database table entries to be merged together with a related index tree. In addition to the above discussed merge techniques, one also needs to support a primary key uniqueness despite its multi-valued nature. Principally, one needs to store a plurality of primary key values pointing to the same Row-ID.

In a given table, aliases can be stored in a single column as a collection of aliases. When an index is created on this column to maintain a primary key constraint, the list of aliases is split to individual aliases, and each of them is used as a single value in the index. All those index leaves point to the same record in the table. This is shown in FIG. 5a and FIG. 5b. In FIG. 5a there are two leaves of the index tree referring to different rows in the unmanaged table, wherein in FIG. 5b, the same two index tree leaves now point to the same record having the multi-valued key and the unique Row-ID.

FIGS. 6a and 6b show entries of database table entries to be merged under a naming rule together with a related index tree. These figures refer to the case of child tables. In this case, one additional index is created based on a superior (or parent) alias. The list of superior aliases is split to individual aliases and each of them is used as a single value in the index. Those values are stored in leaf nodes and point to one single record in the child table.

FIGS. 6a and 6b show entries of database table entries to be merged under a naming rule together with a related index tree. For addresses, one has an additional index based on the superior attribute "customer", as shown in FIG. 6a.

Of course, if one has 3 child records and 2 parent primary keys, one ends up with 6 leaf nodes because one needs to be able to find all 3 rows for both parent primary keys CNR1 #A and CNR2 #B, as shown in FIG. 6b.

FIG. 7 shows a block diagram of an embodiment of the database system 700 for unambiguously identifying entities in a database system. The database system 700 comprises first storage means—in particular a first storage unit 702—adapted for storing data items in a table of a database system, wherein the data items are stored as records comprising a plurality of attributes.

The database system 700 also comprises second storage means—in particular a second storage unit 704—adapted for storing naming rules for selected combinations of the attributes of the data item and prioritization means—in particular, a prioritization module 706—adapted for prioritizing the naming rules as well as determining means—in particular, a determination unit 708—adapted for determining a hash value for each of the selected combinations of the attributes of the data item.

Last but not least, the database system 700 comprises identification means—in particular, an identification module 710—adapted for identifying duplicate data items using the determined hash values and the prioritized naming rules.

It may be noted that the modules, units and/or means can be interconnected for a signal and/or message exchange between or among them. The connection may either be implemented in a one-to-one manner or using a database system internal bus system 712. To this database system internal bus system 712, the first storage unit 702, the second storage unit 704, the prioritization module 706, the determination unit 708 and the identification module 710 can be connected directly or indirectly.

FIG. 8 depicts a block diagram 900 of devices within the present invention, in accordance with the exemplary embodiments. It should be appreciated that FIG. 8 provides only an illustration of one implementation and does not imply any limitations with regard to the environments in which different embodiments may be implemented. Many modifications to the depicted environment may be made.

Devices used herein may include one or more processors 906, one or more computer-readable RAMs 908, one or more computer-readable ROMs 910, one or more computer readable storage media 916, device drivers 930, read/write drive or interface 918, network adapter or interface 922, all interconnected over a communications fabric 912. Communications fabric 912 may be implemented with any architecture designed for passing data and/or control information between processors (such as microprocessors, communications and network processors, etc.), system memory, peripheral devices, and any other hardware components within a system.

One or more operating systems 914, and one or more application programs are stored on one or more of the computer readable storage media 916 for execution by one or more of the processors 906 via one or more of the respective RAMs 908 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 918 to read from and write to one or more portable computer readable storage media 920. Application programs on said devices may be stored on one or more of the portable computer readable storage media 920, read via the respective R/W drive or interface 918 and loaded into the respective computer readable storage media 916.

Devices used herein may also include a network adapter or interface 922, such as a TCP/IP adapter card or wireless communication adapter (such as a 4G wireless communication adapter using OFDMA technology). Application programs on said computing devices may be downloaded to the computing device from an external computer or external storage device via a network (for example, the Internet, a local area network or other wide area network or wireless network) and network adapter or interface 922. From the network adapter or interface 922, the programs may be loaded onto computer readable storage media 916. The network may comprise copper wires, optical fibers, wireless transmission, routers, firewalls, switches, gateway computers and/or edge servers.

Devices used herein may also include a display screen 924, a keyboard or keypad 926, and a computer mouse or touchpad 928. Device drivers 930 interface to display screen 924 for imaging, to keyboard or keypad 926, to computer mouse or touchpad 928, and/or to display screen 924 for pressure sensing of alphanumeric character entry and user selections. The device drivers 930, RAY drive or interface 918 and network adapter or interface 922 may comprise hardware and software (stored on computer readable storage media 916 and/or ROM 910).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system MN may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 40 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multimedia modification 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for unambiguously identifying entities in a database system, the method comprising:
  storing data items in a table of a database, wherein the data items are stored as records comprising a plurality of attributes;
  storing naming rules for selected combinations of the attributes of the data items, wherein the naming rules are based on the plurality of attributes including at least, in combination, a customer name and the customer's related employer identification number (EIN);
  prioritizing the naming rules by defining a sequence of applying the naming rules or defining an order of the naming rules, depending on an importance of the naming rules for entity detection, wherein the combination of the customer name and the customer's related EIN have a comparably high priority as compared to the customer name alone;

determining a hash value for each of the selected combinations of the attributes of the data items, identifying duplicate data items using the determined hash values and the prioritized naming rules; and merging the identified duplicate data items into a merged data item, with the naming rules with higher priority defining where the attributes for the merged data item come from.

2. The method according to claim 1, wherein the database system is a relational database system, and wherein an entry into the database system automatically triggers a database engine to create the naming rules associated with the entry.

3. The method according to claim 1, wherein the database system is a configuration management database that underlies a specific internal organization and is used to manage a plurality of technical devices and applications in a plurality of data centers.

4. The method according to claim 1, further comprising merging the identified duplicate data items by maintaining the determined hash values as a multi-valued key for the merged data item.

5. The method according to claim 4, further comprising merging other data items that are in composite relationship with the identified data items.

6. The method according to claim 4, further comprising maintaining a pointer to a same row identifier of one of the merged data items for the determined hash values.

7. The method according to claim 1, further comprising:
maintaining an index of the table; and
maintaining a pointer in a search tree related to the index, such that the pointer points to the same record identifiers of a combined data item, wherein the combined data item is determined based on splitting a superior alias into two or more individual aliases and each of the two or more individual aliases is used as a single value in the index.

8. The method according to claim 1, further comprising:
using a create SQL statement adapted for a creating of the naming rule and its related priority.

9. The method according to claim 1, further comprising:
using a multi-value primary key for sorting records in the table of the database, wherein the multi-value primary key is a unique row identifier.

10. The method according to claim 1, wherein a multi-value primary key is used for clustering cluster data on multi-node database engines.

11. The method according to claim 9, wherein a multi-value primary key is comparable to a single value column data item.

12. The method according to claim 1, further comprising collecting statistical database data for data blocks for single-valued primary keys and multi-valued primary keys.

13. A computer system for unambiguously identifying entities in the database system, the computer system comprising:
one or more computer processors, one or more computer-readable storage media, and program instructions stored on the one or more of the computer-readable storage media for execution by at least one of the one or more processors capable of performing a method, the method comprising:

storing data items in a table of a database, wherein the data items are stored as records comprising a plurality of attributes;

storing naming rules for selected combinations of the attributes of the data items, wherein the naming rules are based on the plurality of attributes including at least, in combination, a customer name and the customer's related employer identification number (EIN);

prioritizing the naming rules by defining a sequence of applying the naming rules or defining an order of the naming rules, depending on an importance of the naming rules for entity detection, wherein the combination of the customer name and the customer's related EIN have a comparably high priority as compared to the customer name alone;

determining a hash value for each of the selected combinations of the attributes of the data items, identifying duplicate data items using the determined hash values and the prioritized naming rules; and merging the identified duplicate data items into a merged data item, with the naming rules with higher priority defining where the attributes for the merged data item come from.

14. The computer system according to claim 13, wherein the database system is a relational database system.

15. The computer system according to claim 13, wherein the database system is a configuration management database.

16. The computer system according to claim 13, further comprising merging the identified duplicate data items by maintaining the determined hash values as a multi-valued key for a merged data item.

17. The computer system according to claim 16, further comprising merging other data items that are in composite relationship with the identified data items.

18. The computer system according to claim 16, further comprising maintaining a pointer to a same row identifier of one of the merged data items for the determined hash values.

19. The computer system according to claim 13, further comprising:
maintaining an index of the table; and
maintaining a pointer in a search tree related to the index, such that the pointer points to the same record identifiers of a combined data item, wherein the combined data item is determined based on splitting a superior alias into two or more individual aliases and each of the two or more individual aliases is used as a single value in the index.

20. A computer program product for unambiguously identifying entities in a database system, the computer program product comprising:
one or more non-transitory computer-readable storage media and program instructions stored on the one or more non-transitory computer-readable storage media capable of performing a method, the method comprising:

storing naming rules for selected combinations of the attributes of the data items, wherein the naming rules are based on the plurality of attributes including at least, in combination, a customer name and the customer's related employer identification number (EIN);

prioritizing the naming rules by defining a sequence of applying the naming rules or defining an order of the naming rules, depending on an importance of the naming rules for entity detection, wherein the combination of the customer name and the customer's related EIN have a comparably high priority as compared to the customer name alone;

determining a hash value for each of the selected combinations of the attributes of the data items, identifying duplicate data items using the determined hash values and the prioritized naming rules; and merging the identified duplicate data items into a merged data item, with the naming rules with higher priority defining where the attributes for the merged data item come from.

\* \* \* \* \*